United States Patent
Varga et al.

(10) Patent No.: US 9,869,396 B2
(45) Date of Patent: Jan. 16, 2018

(54) VALVE SEALING ARRANGEMENT

(71) Applicant: Seetru Limited, Bristol (GB)

(72) Inventors: Otto Varga, Bristol (GB); Raymond Morton, Bristol (GB)

(73) Assignee: SEETRU LIMITED, Bristol (GB)

( * ) Notice: Subject to any disclaimer, the term of this patent is extended or adjusted under 35 U.S.C. 154(b) by 0 days.

(21) Appl. No.: 14/912,886

(22) PCT Filed: Aug. 20, 2014

(86) PCT No.: PCT/GB2014/052555
§ 371 (c)(1),
(2) Date: Feb. 18, 2016

(87) PCT Pub. No.: WO2015/025161
PCT Pub. Date: Feb. 26, 2015

(65) Prior Publication Data
US 2016/0201809 A1    Jul. 14, 2016

(30) Foreign Application Priority Data
Aug. 20, 2013 (GB) .................... 1314878.8

(51) Int. Cl.
F16K 1/36 (2006.01)
F16K 1/46 (2006.01)
F16K 17/04 (2006.01)

(52) U.S. Cl.
CPC ............. *F16K 1/36* (2013.01); *F16K 1/46* (2013.01); *F16K 17/0466* (2013.01)

(58) Field of Classification Search
CPC ........... F16K 1/36; F16K 17/0466; F16K 1/46
(Continued)

(56) References Cited

U.S. PATENT DOCUMENTS

| 632,502 | A | * | 9/1899 | Monnier | ............ F16K 31/0655 |
| | | | | | 251/274 |
| 1,411,904 | A | * | 4/1922 | Bloch | .................. F16K 1/482 |
| | | | | | 251/86 |

(Continued)

FOREIGN PATENT DOCUMENTS

CH 694279 A5 10/2004
DE 1101082 3/1961
(Continued)

OTHER PUBLICATIONS

Eurasian Search Report dated 2016 Sep. 5 for Application No. 201690431.

(Continued)

*Primary Examiner* — Craig Schneider
*Assistant Examiner* — Andrew J Rost
(74) *Attorney, Agent, or Firm* — Howard & Howard Attorneys PLLC

(57) ABSTRACT

A valve comprises a fluid outlet, a fluid inlet, a valve seat (103) and a valve disk (102) arranged to move relative to the valve seat to control the flow of fluid from the inlet to the outlet. The valve disk (102) comprises a body (201) and a sealing member (202), wherein the valve disk is connected to a spindle (101) via an articulating joint comprising two abutting surfaces, one of which is arranged to allow rocking motion between the surfaces providing the articulation thereby allowing the sealing member (202) to self-align on the valve seat (103). The articulating joint may be formed by an end surface of the spindle (101) abutting a ball bearing (207) located in a cavity (200) in the top of the valve disk (102).

13 Claims, 4 Drawing Sheets

(58) Field of Classification Search
USPC .............................................. 251/84, 86, 88
See application file for complete search history.

(56) References Cited

U.S. PATENT DOCUMENTS

| | | | |
|---|---|---|---|
| 2,417,494 A | | 3/1947 | Hoof |
| 2,628,633 A | * | 2/1953 | Folmsbee ................ F16K 1/46 137/469 |
| 2,657,897 A | * | 11/1953 | Folmsbee ................ F16K 1/46 251/333 |
| 2,678,187 A | * | 5/1954 | Peters ...................... F16K 1/46 137/510 |
| 2,848,187 A | * | 8/1958 | Guy ......................... F16K 1/20 251/85 |
| 3,301,524 A | | 1/1967 | Varga |
| 3,510,100 A | * | 5/1970 | Bokelman ............... F16K 23/00 251/129.2 |
| 3,612,479 A | * | 10/1971 | Smith, Jr. ................ F16K 1/38 251/146 |
| 4,036,250 A | | 7/1977 | Dashner |
| 4,228,987 A | | 10/1980 | Potter |
| 4,474,358 A | | 10/1984 | Bennett |
| 4,543,987 A | | 10/1985 | Ekeleme, Jr. et al. |
| 2006/0157116 A1 | | 7/2006 | Martin et al. |

FOREIGN PATENT DOCUMENTS

| | | |
|---|---|---|
| DE | 1924476 | 11/1970 |
| DE | 1500290 | 3/1972 |
| EP | 1114955 A2 | 7/2001 |
| FR | 1534472 | 7/1968 |
| FR | 2268206 | 11/1975 |
| GB | 164643 A | 6/1921 |
| GB | 1095046 | 12/1967 |
| GB | 1100920 A | 1/1968 |
| GB | 1104639 | 2/1968 |
| GB | 2109900 A | 6/1983 |
| GB | 2135026 A | 8/1984 |
| GB | 2137736 A | 10/1984 |
| GB | 2388648 A | 11/2003 |
| WO | 8704789 | 8/1987 |
| WO | 2006092548 A1 | 9/2006 |

OTHER PUBLICATIONS

GB Search Report dated Dec. 14, 2012 for Application No. GB1221218.9.
GB Search Report dated Sep. 16, 2013 for Application No. GB1314878.8.
International Search Report dated Jun. 7, 2015 for International Application No. PCT/GB2014/052555.
International Preliminary Report on Patentability dated Feb. 23, 2016 for International Application No. PCT/GB2014/052555.

\* cited by examiner

VALVE SEALING ARRANGEMENT

CROSS REFERENCE TO RELATED APPLICATION

This application is a national stage application of PCT/GB2014/052555, filed Aug. 20, 2014, which claims priority to GB Patent Application No. GB 1314878.8, filed Aug. 20, 2013, the disclosures of which are hereby incorporated by reference in their entirety.

FIELD OF THE INVENTION

This invention concerns improvements in or relating to valve sealing arrangements and has particular although not exclusive applications in such arrangements for use in safety valves.

BACKGROUND TO THE INVENTION

It will be appreciated that there are numerous applications in industry in which valve sealing arrangements are required to control the flow of a fluid passing through a valve. One example of an application is in safety valves which are used to control the pressure of a fluid in a closed system. In this application a sealing arrangement is required which can form a completely leak proof seal when the valve is held closed during normal operation conditions and can break the seal to allow fluid to pass through the valve when the valve is opened in the event that the pressure in the system rises above threshold level. Such sealing arrangements typically provide a valve disk (or plunger) with a sealing member fitted in a groove machined around the circumference of the valve disk. The valve disk is then forced against a valve seat which closes the flow path preventing the flow of fluid through the valve. Such an arrangement is well suited to the use of a highly flexible elastomer seal. The seal can be stretched over the valve disk and slipped into the machined groove which holds it in place. In applications where a valve may be used with a wide range of industrial liquids such as with hot water, saturated steam or hot gases, elastomer seals do not perform as well as tougher but less flexible seals such as PTFE seals. A problem with using less flexible seals is that the quality of the seal is more dependent on accurate alignment between the disk and the seat.

SUMMARY TO THE INVENTION

The present invention provides a valve comprising a fluid outlet, a fluid inlet, a valve seat and a valve disk arranged to move relative to the valve seat to control the flow of fluid from the inlet to the outlet, the valve disk comprising a body and a sealing member, wherein the valve disk is connected to a spindle via an articulating joint comprising two abutting surfaces, one of which is arranged to allow rocking motion between the surfaces providing the articulation thereby allowing the sealing member to self-align on the valve seat.

The rocking motion may include one surface rolling over the other or one surface pivoting in any direction over the other. One of the two surfaces may be convex. The surfaces may be arranged so there is no relative slip between the surfaces during the rocking motion. There may be a point contact between the two surfaces and the point contact may move across both surfaces, at the same speed, by the rocking motion.

The articulating joint may be formed by an end surface of the spindle abutting a ball bearing located in a cavity in the top of the valve disk. The cavity may have a bottom which engages with the ball bearing and substantially prevents rolling of the ball bearing relative to the valve disk. The bottom of the cavity may engage with the ball bearing via a ring contact. The end of the spindle may extend into the cavity, the spindle being a lose fit in the cavity so that the valve disk can rock relative to the spindle. The ball bearing may be an interference fit in the cavity. An interference fit being one in which the diameter of the ball bearing is sized slightly larger than the diameter of the cavity so that the ball bearing can be forced into the cavity and cannot freely drop out of the cavity once inserted. There may be a point contact with the balling bearing allowing the ball bearing to rock relative to the end surface. The end surface may be substantially flat or convex.

The cavity may have a tapered bottom and a diameter larger than that of the spindle whereby the valve disk can pivot relative to the spindle. The sealing member may lie within a recess formed in the body. The recess may have a profiled side wall retaining the sealing member in the valve disk.

The recess may have a closed end and an open end, and the recess may have a widest point which may be wider than the open end. The recess may have a curved side wall and a substantially flat base.

The profiled wall may make direct contact with more than one quarter of the cross sectional perimeter of the sealing member.

The valve disk may comprise a rim and a guard member positioned on the opposite side of the sealing member to the rim thereby to form the recess.

The guard member may be located on the valve disk by a spigot which protrudes from the body and a retaining means which retains the guard member on the spigot.

The present invention further provides a valve disk comprising a body and a sealing member, wherein a cavity is formed in a top surface of the body, the cavity having a ball bearing located at the base of the cavity, wherein the sealing member lies within a recess formed in a bottom side of the body, the recess retaining the sealing member in the valve disk.

The cavity in the top of the valve disk may have a tapered base and the ball bearing may be located in the taper. The ball bearing may be an interference fit in the base of the cavity.

The recess may have a profiled side wall and a guard member may be fitting within the recess to form the groove which retains the sealing member in the valve disk. Alternatively, a guard member may be fitted within the recess to form a groove and the guard member may have a profiled side wall which retains the sealing member in the valve disk. The profiled side wall may extend from a closed end of the recess, past a maximum cross-section of the sealing member, and then at least partially radially inwards. Alternatively, the profiled side wall on the guard member may extend from a closed end of the recess, past a maximum cross-section of the sealing member, and then at least partially radially outwards.

The invention further provides a valve comprising a fluid outlet, a fluid inlet, a valve seat and a valve disk arranged to move relative to the valve seat to control the flow of fluid from the inlet to the outlet, the valve disk comprising a body and a sealing member, wherein the sealing member lies within a recess formed in the body, the recess having a profiled side wall retaining the sealing member in the valve disk.

The recess may have a closed end and an open end, and the recess may have a widest point which is wider than the open end. The recess may have a curved side wall and a substantially flat base.

The profiled wall may make direct contact with more than one quarter of the cross sectional perimeter of the sealing member. The valve disk may comprise a rim and a guard member positioned on the opposite side of the sealing member to the rim thereby to form the recess. The guard member may be located on the valve disk by a spigot which protrudes from the body and a retaining means which retains the guard member on the spigot.

The valve disk may be connected to a spindle via an articulating joint thereby allowing the valve disk to self-align on the valve seat. The articulating joint may comprise two surfaces, one of which may be convex and arranged to rock on the other to allow the articulation. The articulating joint may be formed by an end surface of the spindle abutting a ball bearing located in a cavity in the top of the valve disk.

The end surface may be substantially flat or convex so that there is a point contact with the balling bearing allowing the end surface to rock relative to the ball bearing.

The cavity may have a tapered bottom and a diameter larger than that of the spindle whereby the valve disk can pivot relative to the spindle.

The invention further provides a valve disk comprising a body, a sealing member and a guard member wherein the sealing member lies in a groove formed by the valve disk and the guard member, the groove having an opening narrower than the widest cross-section of the sealing member thereby retaining the sealing member within the groove.

The body may have a recess with a profiled side wall and the guard member may be fitting within the recess to form the groove. Alternatively, the guard member may have a profiled side wall, the body may have a recess, and the guard member may be fitted within the recess to form the groove. The profiled side wall may extend from a closed end of the recess, past a maximum cross-section of the sealing member, and then at least partially radially inwards. The profiled side wall may extend from a closed end of the recess, past a maximum cross-section of the sealing member, and then at least partially radially outwards.

The invention further provides a valve disk comprising a body and a sealing member wherein the sealing member lies in a recess formed in the body, the recess having an opening narrower than the diameter of the sealing member thereby retaining the sealing member within the recess.

The valve disk may further comprise a cavity suitable for receiving a ball bearing and a spindle. The cavity may have a tapered bottom. The sealing member may be a PTFE O-ring seal.

Some embodiments of the present invention provide a valve with a robust sealing arrangement that can be used to control the flow of a wide range of industrial liquids, vapours and gases, for instance they may be suitable for use with hot water and saturated steam as well as gases. The arrangement can allow the use of a robust sealing member made from PTFE (or similar material) which may be fitted to the valve without damaging the sealing member by over stretching. The arrangement may provide accurate location for the sealing member such that full sealing contact can be made with a valve seat simultaneously over the entire seal area. The arrangement also may ensure that the sealing member does not become dislodged by turbulence or other effects.

The valve, or disk, may further comprise any one or more features, in any combination, of the preferred embodiments of the invention which will now be described by way of example only with reference to the accompanying drawings.

DESCRIPTION OF THE PREFERRED EMBODIMENTS

Figure 1:
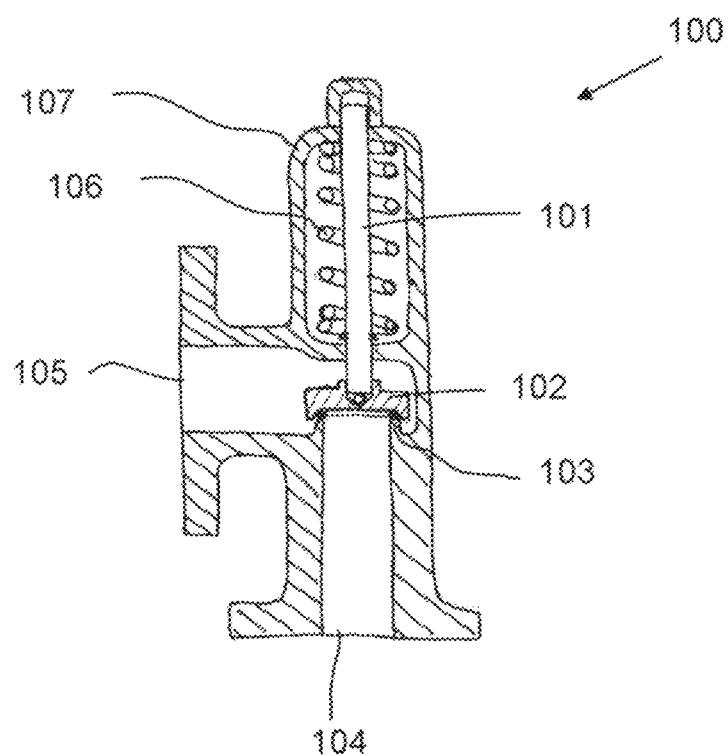
FIG. 1 shows a section through a safety valve according to an embodiment of the present invention.

Referring to FIG. 1, a valve 100 comprises a valve body 107 which defines an inlet 104 and an outlet 105 at 90 degrees to each other for fluid which may pass through the valve following an 'L' shaped flow path. Fluid flow from the inlet 104 to the outlet 105 is controlled by a valve disk 102 which can seal or open the flow path between the valve outlet and inlet. Part of the body forms a valve seat 103 which is a flat annular surface which encompasses the flow path from the inlet. The valve disk 102 is positioned directly above the valve seat 103 at the 90 degree bend between the outlet and inlet and retains a sealing member in its base. In this embodiment the sealing member is a PTFE 'O' ring. When the valve disk is forced against the valve seat the sealing member forms a leak proof seal between the two.

The valve disk 102 is located on the end of a spindle 101 which is slidably mounted on the valve body 107 and is acted on by a spring 106 which applies a biasing force to the valve disk via the spindle. The spring is held in a cavity in the valve body 107 separate to the fluid flow path. Under normal operating conditions the valve disk 102 is biased against the valve seat 103 where the 'O' ring in the valve disk forms a leak proof seal between the valve disk and the valve seat, and the valve disk prevents the flow of fluid through the valve. The valve will open if the pressure of the fluid at the valve inlet 104 exceeds a threshold such that the force it creates on the valve disk overcomes the spring force. The valve disk will move axially away from the valve seat allowing fluid to pass to the outlet reducing the pressure of the fluid at the inlet. Once the pressure of the fluid at the inlet falls below the threshold the valve will close again under the spring force, causing the valve disk to reseat and form a seal with the valve seat.

Figure 2:
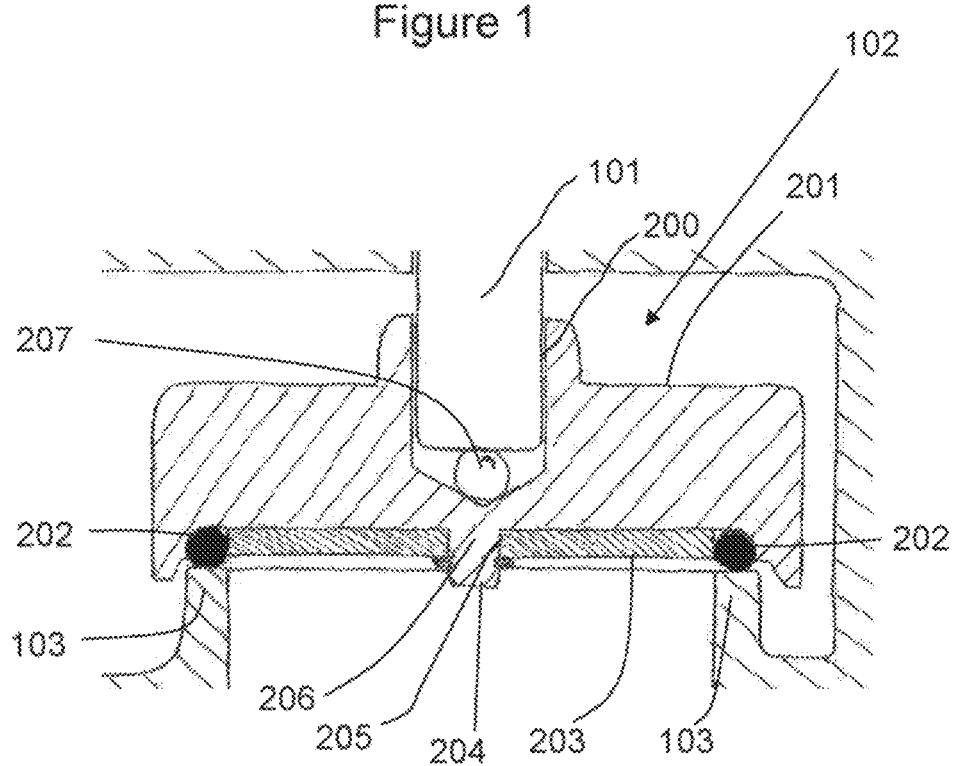
FIG. 2 shows an enlarged section through the valve disk shown in FIG. 1.
Figure 8:
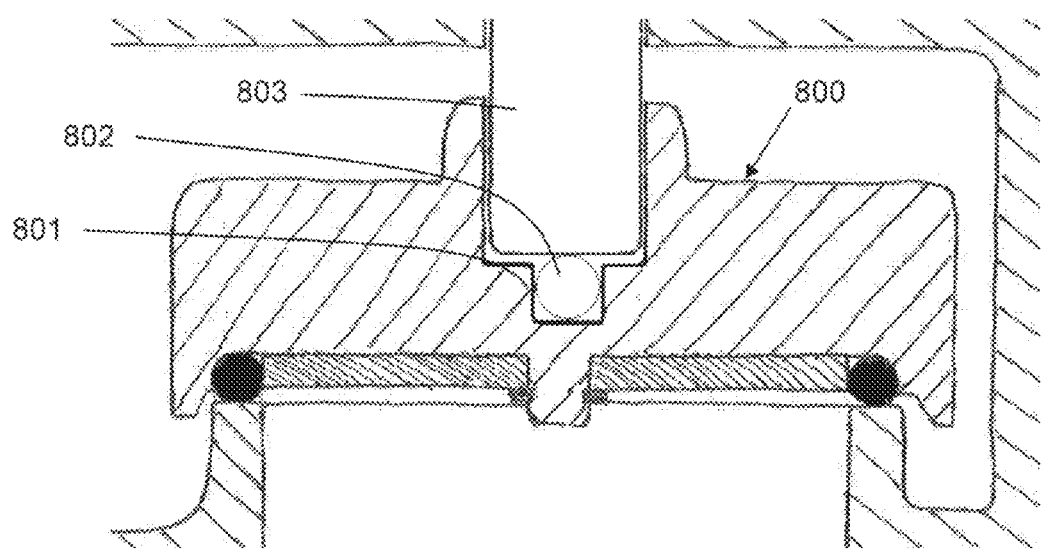
FIG. 8 shows a fourth modification to the embodiment of FIGS. 1 to 4.

The valve disk 102, shown in more detail in FIG. 2, has a body 201, the PTFE 'O' ring 202 and a guard ring 203. The valve disk body 201 is a round flat disk of bronze, brass, stainless steel, or similar material. The spindle 101 is a rod of stainless steel with a hardened end ground flat perpendicular to the length of the rod. An articulated joint connects the spindle 101 and the valve disk 102. This allows the valve disk to pivot relative to the spindle so that any slight misalignment between the spindle and valve seat can be accommodated by the joint which would otherwise result in a poor seal between the valve sealing member and the valve seat. The joint is formed by the spindle being located loosely in a cavity 200 in the centre of the top of the valve disk. The cavity 200 is a bore of circular cross-section with a lower end, or bottom, that tapers to a point, and placed within the bore is a hard stainless steel ball bearing 207 which rests in the V of the taper. For bores in the range of 15 to 50 mm diameter, a ball bearing of approximately 5 mm would be particularly suitable, although other sizes may be used. The taper locates the ball bearing in the centre of the valve disk and the flat lower end of the spindle makes a point contact against the top of the ball bearing 207 which holds it in place. The bottom of the cavity makes a ring contact around the bottom of the ball bearing preventing the ball bearing from rolling around in the cavity so that the balling bearing is prevented from rolling relative to the valve disk. The V of the taper may form any angle less than 180 degrees but angles of 90 degrees or less work best. It will be appreciated that the ball bearing may be located in the base of the bore by other means. One example is shown in FIG. 8 in which the valve disk 800 has a separate bore or recess 801 in the base of the bore which receives the spindle 803 into which the ball bearing 802 will fit, for example as an interference fit. The ball bearing 802 is held in position in the valve disk 800 by a ring contact between the circumference of the ball bearing and the wall of the recess 801. The ring contact provides the interference fit which prevents the bearing rolling relative to the valve disk. The biasing force from the spindle is applied through the ball bearing 207 to the centre of the valve disk 102 so that force is equally distributed around the 'O' ring. When the valve disk is pivoted relative to the spindle, the spindle's loose fit in the cavity 200 in the top of the valve disk and its point contact with the face of the ball bearing prevents the spindle becoming jammed within the cavity so that the valve disk is free to articulate relative to the spindle. As the valve disk pivots relative to the spindle, the point contact between the ball bearing and the spindle moves across the end surface of the spindle. Considering a point on the surface of the spindle, the rocking motion will cause the point to roll into contact with the surface of the ball bearing and roll out of contact. The points of contact on the surfaces will move across the surfaces at the same speed. Because articulation is achieved by rocking of the surface of the ball bearing across the surface of the spindle, without any slipping of one surface relative to the other, no sliding friction is involved (only rolling friction) and therefore there is very little resistance to the articulation.

The use of an articulated joint with a PTFE (or similar material) seal provides excellent alignment and improved sensitivity of the valve. This is particularly advantageous when using relatively hard sealing materials such as PTFE which otherwise may not form a good seal.

In the base of the valve disk 102 which forms the sealing face there is a recess in which the 'O' ring is located. The recess has an open end on the base of the valve disk and a closed end within the valve disk. The recess is circular and extends near to the edge of the outer circumference of the valve disk and has a profiled side wall and a flat closed end. The open end of the recess is on the surface which forms the base of the valve disk. In this embodiment the profiled side wall features a flat step located approximately halfway between the top and bottom of the recess. The bore of the recess is narrower between the closed end of the recess and the step than between the open end of the recess and the step. The step splits the profiled wall of the recess into two portions, a lower or inner portion located between the step and the closed end of the recess and an upper or outer portion located between the step and the open end of the recess.

Figure 3:
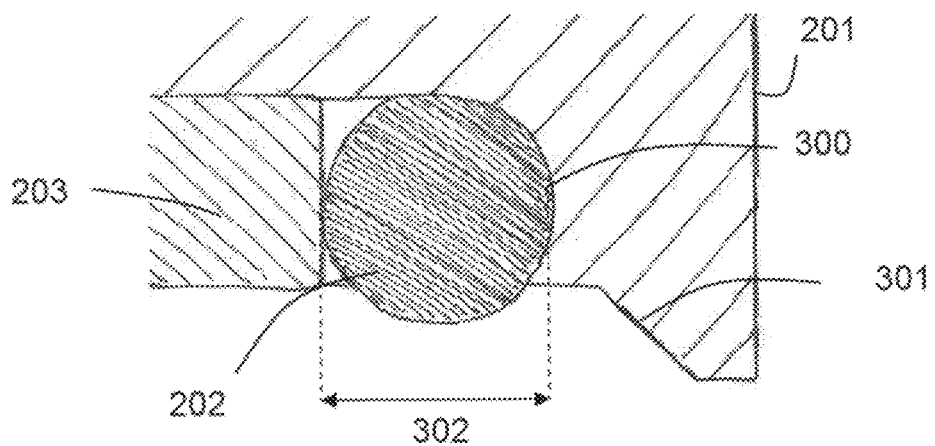
FIG. 3 shows an enlargement of part of FIG. 2 showing a sealing member.
Figure 4:
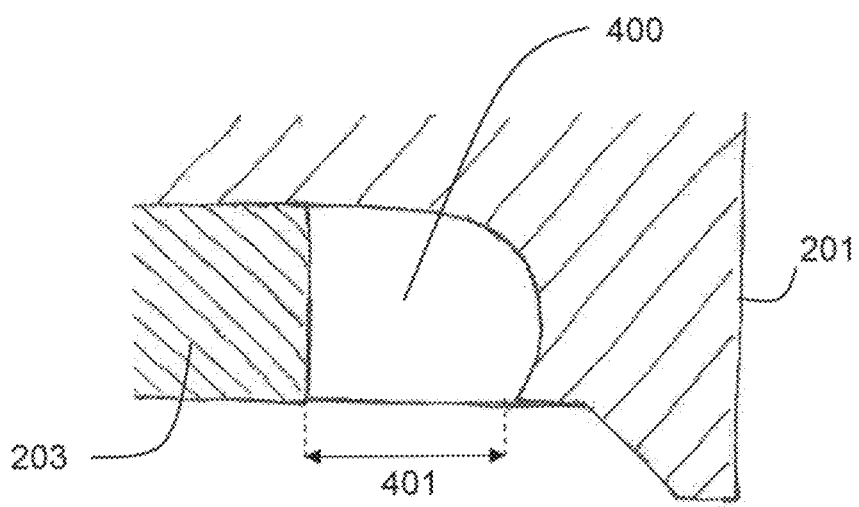
FIG. 4 is a section similar to FIG. 3 with the sealing member removed.

As shown in FIG. 3, the 'O' ring is positioned at the closed end of the recess and is retained in the recess by the lower portion of the profiled side wall. The lower portion of the profiled side wall follows the shape of the surface of the 'O' ring from where it makes contact with the closed end of the recess and then follows the cross-sectional profile of the 'O' ring around past the wider cross-section and back to a narrower cross-section which is approximately one third of the way around the 'O' ring's cross sectional perimeter. Approximately one third of the surface area of the 'O' is in contact with the lower portion of the profiled side wall. Therefore, the lower portion of the profiled side wall creates an opening in the recess with a diameter which is narrower than the maximum outer diameter of the 'O' ring which prevents it from slipping axially out of the recess. Although in this embodiment the profiled wall extends in cross-section approximately one third of the way around the 'O' ring's cross-sectional perimeter it will be appreciated that the 'O' ring will be retained in the recess providing that it extends more than one quarter of the way around, and any amount more than this is variable providing that the wall does not interfere with the seal making contact with the valve seat.

The upper portion of the profiled side wall is shaped to form a chamfered rim 301.

The chamfer is placed on the inner corner of the rim so that the thickness of the rim reduces from the step towards the top of the recess. When the valve disk 201 is seated on top of the valve seat 103 the chamfered rim 301 of the valve disk encircles the valve seat and extends below it. The chamfer is placed on the inner corner of the rim so that when the valve disk is lifted away from the valve seat and fluid is allowed to flow between the 'O' ring and the valve seat, the flow path of the fluid is diverted by the chamfered rim to flow partly radially and partly towards the valve seat, in a direction in the plane of the chamfer. This imparts a lifting force on the valve disk encouraging the valve disk to lift further once opened.

In the embodiment shown in FIGS. 1 to 4, a guard ring 203 is used to provide further protection against the 'O' becoming dislodged. The guard ring 203 is positioned in the recess so that it abuts the radially inner side of the 'O' ring 202 on the opposite side to the lower portion 300 of the profiled side wall preventing the 'O' ring collapsing inwards which could allow it to slip axially out of the valve disk. It will be appreciated that the guard ring can be attached to the valve disk by many possible fixing methods including the use of screws or adhesive. One fixing method is shown in FIG. 2 where a spigot 204 extends from the body 201 of the valve disk 102 in the centre of the recess. The guard ring has a central hole 205 for locating the guard ring on the spigot and a spring clip 206 fitted to the spigot, retains the guard ring in place. In this arrangement the guard ring 203 and valve disk body 201 form a circular groove 400 which has an opening 401 on the base of the valve disk which forms the sealing face with the valve seat. The groove is substantially 'D' shaped in cross section with the opening along the bottom flat of the 'D'. The width of the opening is narrower than the widest section of the groove which occurs half way down the 'D'. The widest cross section 302 of the 'O' ring is located in the groove, but the 'O' ring does protrude out of the groove in order that it can make contact with the valve seat. However, because the widest cross-section of the 'O' ring is wider than the opening of the groove it is trapped in the groove and prevented from slipping out.

Figure 5:
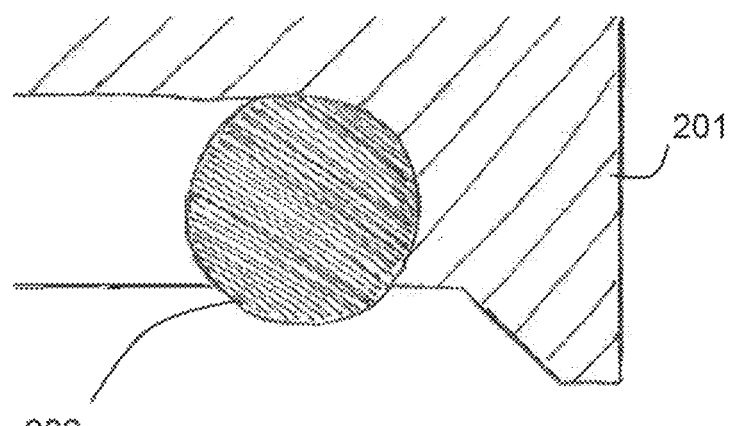
FIG. 5 shows a first modification to the embodiment of FIGS. 1 to 4.

FIG. 5 shows a modification to the valve disk of FIGS. 1 to 4 in accordance with another embodiment of the present invention. In this modification the guard ring has been omitted and the 'O' ring 202 is retained in the valve disk 201 by the profiled wall of the recess alone. The profiled wall forms an opening in the recess which is narrower than the width of the 'O' which retains the 'O' ring in the recess.

Figure 6:
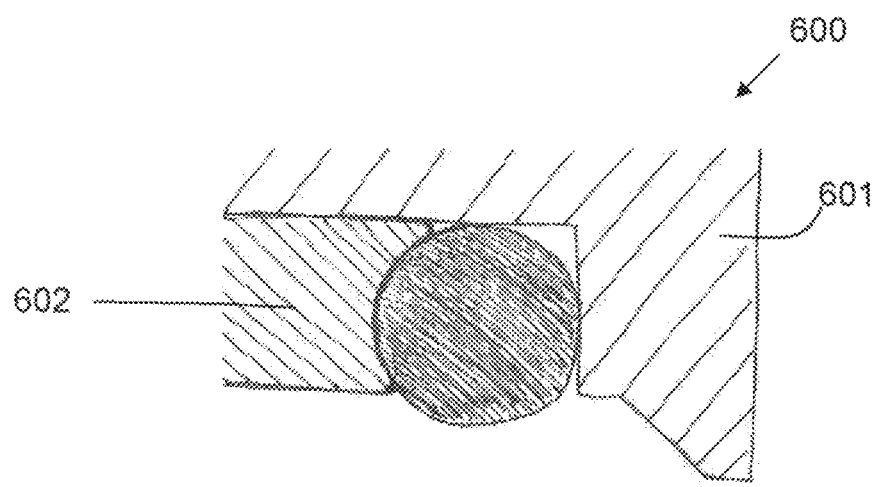
FIG. 6 shows a second modification to the embodiment of FIGS. 1 to 4.

FIG. 6 shows a second modification to the valve disk 600 in accordance with an embodiment of the invention. In this embodiment the guard ring 602 has the profiled side wall instead of the valve disk body 601. It will be appreciated that this provides the same function.

Figure 7:
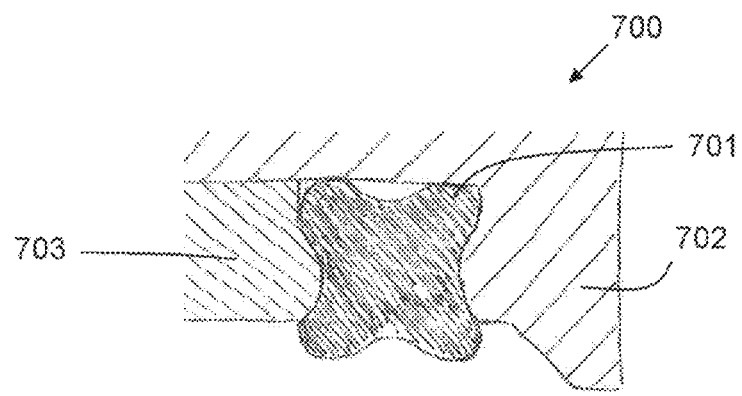
FIG. 7 shows a third modification to the embodiment of FIGS. 1 to 4.

FIG. 7 shows a third modification to the valve disk 700 in accordance with an embodiment of the invention. This embodiment shows how both the guard ring 703 and the valve disk body 702 can have profiled side walls in order to create an opening to the groove which is narrower than the widest cross-section of the sealing member 701 which in this case is a Quad ring 701. A quad ring has a maximum radial diameter at two points through its cross-section due to the upper and lower quads, and the tapered region in-between. In order that the ring is retained in the recess it is only important that the profiled wall surrounds one local maximum cross-sectional width and then moves towards a narrower cross-section, preventing that portion of the ring which contains the local maximum cross-sectional width (and hence the whole ring) from slipping axially out of the recess.

The embodiments described show the sealing means to be an O-ring or Quad ring, but it will be appreciated that rings of other profiles may be used. The material for the sealing means may also be a material other than PTFE; any similar material may be used including elastomers.

The invention claimed is:

1. A valve comprising:
   a fluid outlet;
   a fluid inlet;
   a valve seat;
   a spindle having an end with an end surface thereon, the end surface being substantially flat or convex;
   a valve disk comprising a body and a sealing member, the body having a top defining a cavity, the valve disk being arranged to move relative to the valve seat to control the flow of fluid from the fluid inlet to the fluid outlet; and
   a ball bearing, wherein the ball bearing is located in the cavity and the cavity substantially prevents rolling of the ball bearing relative to the valve disk, the end of the spindle extends into the cavity and the end surface of the spindle abuts the ball bearing, the spindle being a loose fit in the cavity so that the valve disk can rock relative to the spindle; whereby the ball bearing forms an articulating joint, allowing the sealing member to self-align on the valve seat.

2. A valve according to claim 1 wherein the cavity has a bottom which engages with the ball bearing to substantially prevents rolling of the ball bearing relative to the valve disk.

3. A valve according to claim 1 wherein the ball bearing is an interference fit in the cavity.

4. A valve according to claim 1 wherein the end surface of the spindle abuts the ball bearing at a point contact which allows the ball bearing to rock relative to the end surface.

5. A valve according to claim 1 wherein the spindle has a diameter, the cavity has a tapered bottom and a diameter which is larger than the diameter of the spindle whereby the valve disk can pivot relative to the spindle.

6. A valve disk according to claim 1 wherein the body defines a recess and the sealing member lies within the recess, the recess having a profiled side wall retaining the sealing member in the valve disk.

7. A valve according to claim 6 wherein the recess has a closed end and an open end, and the recess has a widest point which is wider than the open end.

8. A valve according to claim 6 wherein the recess has a curved side wall and a substantially flat base.

9. A valve according to claims 6 wherein the sealing member has a cross sectional perimeter and the profiled wall makes direct contact with more than one quarter of the cross sectional perimeter of the sealing member.

10. A valve according to claim 6 wherein the valve disk comprises a rim and a guard member positioned on the opposite side of the sealing member to the rim thereby to form the recess.

11. A valve according to claim 10 wherein the body comprises a spigot which protrudes from the body and a retaining means on the spigot, and the guard member is located on the valve disk by the spigot and the retaining means retains the guard member on the spigot.

12. A valve according to claim 6 wherein the sealing member is a PTFE O-ring seal.

13. A valve according to claim 1 wherein the sealing member is a PTFE O-ring seal.

* * * * *